(12) United States Patent
Beidler et al.

(10) Patent No.: US 12,144,288 B2
(45) Date of Patent: Nov. 19, 2024

(54) FLOATING ANTI-WRAP SYSTEM FOR A CONVEYOR TOPSHAFT

(71) Applicant: CNH Industrial America LLC, New Holland, PA (US)

(72) Inventors: Lyle Beidler, Akron, PA (US); Trevor Book, Lititz, PA (US); Nathan E. Isaac, Lancaster, PA (US); Cale N. Boriack, Lititz, PA (US); Wayne T. Flickinger, Oxford, PA (US)

(73) Assignee: CNH Industrial America LLC, New Holland, PA (US)

( * ) Notice: Subject to any disclaimer, the term of this patent is extended or adjusted under 35 U.S.C. 154(b) by 611 days.

(21) Appl. No.: 17/501,557

(22) Filed: Oct. 14, 2021

(65) Prior Publication Data

US 2023/0118006 A1      Apr. 20, 2023

(51) Int. Cl.

| | |
|---|---|
| *A01D 61/04* | (2006.01) |
| *B65G 23/06* | (2006.01) |
| *A01D 61/00* | (2006.01) |

(52) U.S. Cl.
CPC .............. *A01D 61/04* (2013.01); *B65G 23/06* (2013.01); *A01D 61/008* (2013.01); *B65G 2812/02108* (2013.01)

(58) Field of Classification Search
CPC ........ B65G 23/06; B65G 23/08; B65G 23/22; B65G 2812/02108; A01D 61/008; A01D 61/02; A01D 61/04; A01F 12/10; A01F 12/16
See application file for complete search history.

(56) References Cited

U.S. PATENT DOCUMENTS

| | | |
|---|---|---|
| 5,245,817 A | 9/1993 | Hohnl |
| 5,364,310 A | 11/1994 | Taylor |

(Continued)

FOREIGN PATENT DOCUMENTS

| | | |
|---|---|---|
| CN | 202232199 U | 5/2012 |
| EP | 0891696 A1 | 1/1999 |
| EP | 3219195 A1 | 9/2017 |

OTHER PUBLICATIONS

Extended European Search Report for EP Application No. 22200711.4 dated Feb. 13, 2023 (four pages).

*Primary Examiner* — Gene O Crawford
*Assistant Examiner* — Keith R Campbell
(74) *Attorney, Agent, or Firm* — Peter K. Zacharias; Rebecca L. Henkel; Rickard K. DeMille

(57) ABSTRACT

An agricultural vehicle feeder assembly having: a feeder housing, a shaft mounted to rotate relative to the feeder housing, first and second rotary drives mounted to rotate with the shaft at a first and second axial positions along the shaft, and an anti-wrap cover assembly extending an entire distance from the first rotary drive to the second rotary drive and at least partially surrounding the first rotary drive, the second rotary drive, and the shaft between the first rotary drive and the second rotary drive. The anti-wrap cover assembly is rotatably mounted the first rotary drive, the second rotary drive and/or the shaft. A connector joins the feeder housing to the anti-wrap cover assembly. The connector is configured to allow the anti-wrap cover assembly to move through a predetermined limited range of motion relative to the feeder housing.

24 Claims, 7 Drawing Sheets

(56) References Cited

U.S. PATENT DOCUMENTS

| | | | | |
|---|---|---|---|---|
| 5,976,013 A | * | 11/1999 | Hamann | A01D 61/008 56/14.5 |
| 6,726,368 B2 | | 4/2004 | Peeters | |
| 8,790,200 B2 | | 7/2014 | Boissonneault et al. | |
| 10,390,485 B2 | * | 8/2019 | Heyns | A01D 57/02 |
| 10,696,484 B2 | | 6/2020 | Massey | |
| 11,441,666 B2 | * | 9/2022 | Boriack | A01D 61/008 |
| 2020/0329625 A1 | | 10/2020 | Ramirez et al. | |

* cited by examiner

FLOATING ANTI-WRAP SYSTEM FOR A CONVEYOR TOPSHAFT

BACKGROUND OF THE INVENTION

Agricultural combines and similar equipment typically include a feeder that connects the header to the vehicle chassis. The feeder includes a conveyor that carries crop material from the header to the chassis. Such conveyors typically comprise multiple slats that are supported on chains. The chains are driven and supported by sprockets mounted on rotating shafts. In a typical feeder, the conveyors wrap around a drum at the inlet, and around sprockets at the outlet. The sprockets are rigidly mounted on a common topshaft, such that all of the sprockets rotate in unison to maintain proper timing of the chains.

During use, crop material can potentially wrap around the sprockets and the sprocket drive shaft. This can lead to mechanical malfunctions and excessive wear, and, when not properly maintained, accumulated crop materials may present a fire hazard.

To address this problem, typical feeder conveyors have an anti-wrap system comprising covers and shields that inhibit the accumulation of crop material on and around the sprockets and topshaft. For example, it is known to provide a system of plastic anti-wrap covers surrounding the conveyor topshaft drive sprockets, and metal shaft covers spanning between the plastic sprocket covers to enclose the topshaft. The covers are rigidly mounted to the feeder house (e.g., to a center structure located within the conveyor loop).

It has been found, however, that the topshaft and sprockets can deflect due to chain tension and crop load. When this happens, the topshaft and sprockets can come into hard contact with the stationary anti-wrap components, causing premature part wear. Furthermore, this deflection can allow gaps to open between the sprocket covers and the shaft covers, allowing for crop ingress into the area around the spinning shaft that is meant to be kept debris-free.

The inventors have determined that the state of the art can still be improved.

This description of the background is provided to assist with an understanding of the following explanations of exemplary embodiments, and is not an admission that any or all of this background information is necessarily prior art.

SUMMARY

In a first exemplary aspect, there is provided a feeder assembly comprising: a feeder housing; a shaft mounted to rotate relative to the feeder housing about a center axis; a first rotary drive mounted to rotate with the shaft at a first axial position along the shaft; a second rotary drive mounted to rotate with the shaft at a second axial position along the shaft, the second axial position being spaced along the center axis from the first axial position; and an anti-wrap cover assembly extending an entire distance from the first rotary drive to the second rotary drive and at least partially surrounding the first rotary drive, the second rotary drive, and the shaft between the first rotary drive and the second rotary drive. The anti-wrap cover assembly is rotatably mounted to at least one of the first rotary drive, the second rotary drive and the shaft. A connector joins the feeder housing to the anti-wrap cover assembly and is configured to allow the anti-wrap cover assembly to move through a predetermined limited range of motion relative to the feeder housing.

In another exemplary aspect, there is provided an agricultural vehicle comprising: a chassis configured for movement on a surface; a header configured to remove crop material from the surface; and a feeder assembly as described in any one or more of the foregoing aspects and examples.

BRIEF DESCRIPTION OF THE DRAWINGS

Embodiments will now be described, strictly by way of example, with reference to the accompanying drawings, in which.

In the figures, like reference numerals refer to the same or similar elements.

DETAILED DESCRIPTION OF EXEMPLARY EMBODIMENTS

Figure 1:
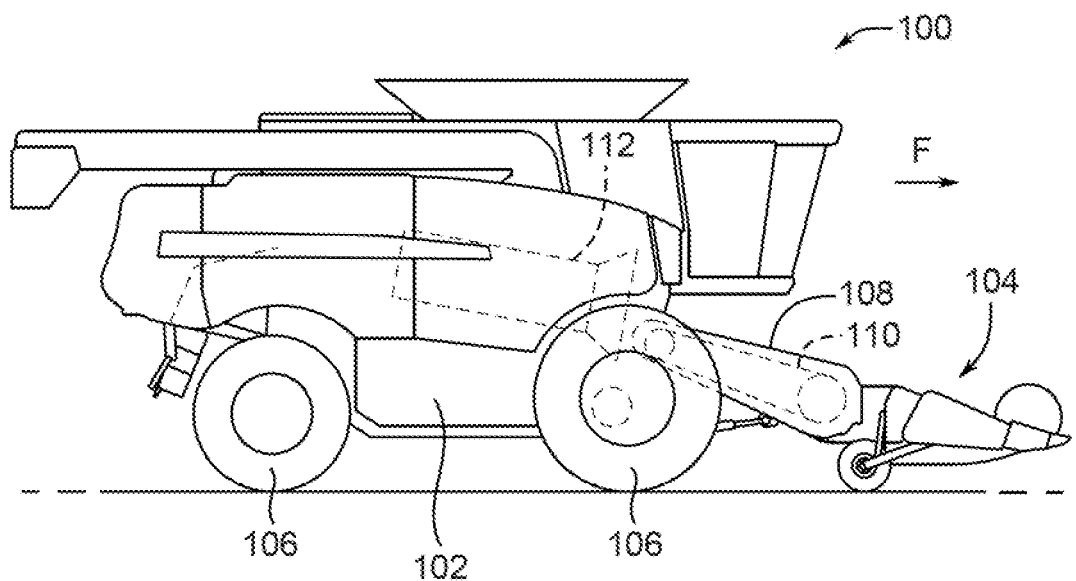
FIG. 1 schematically illustrates an agricultural harvester.

The drawing figures depict one or more implementations in accordance with the present concepts, by way of example only, not by way of limitations. The examples are shown in conjunction with an agricultural combine harvester, but have applicability in any similar agricultural vehicle, such as a windrower.

Figure 2:
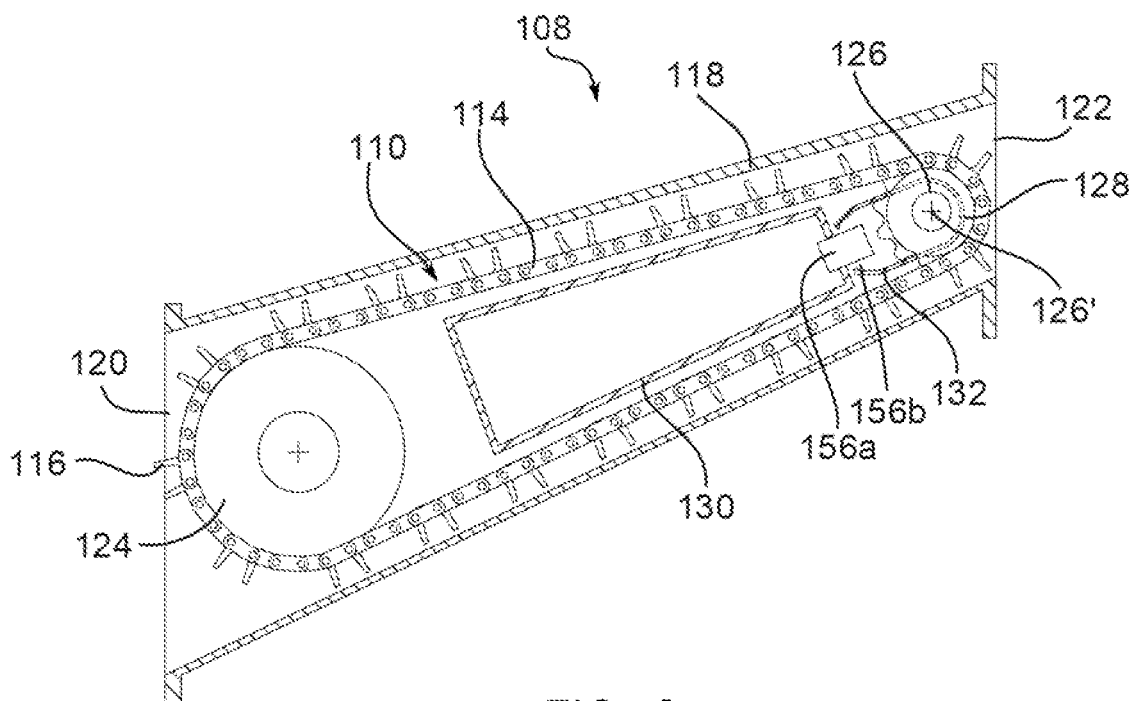
FIG. 2 is a cutaway side view of the feeder assembly of the agricultural harvester of FIG. 1.

FIGS. 1 and 2 show an exemplary embodiment of an agricultural vehicle 100 in the form of a combine harvester, having an anti-wrap cover assembly. The vehicle 100 generally includes a chassis 102 and a header 104 carried by the chassis 102. The chassis 102 is supported on driving wheels 106 (e.g., tracked wheels or pneumatic tires), as known in the art. The vehicle 100 is configured to move in a forward direction, illustrated as arrow F, during harvesting operations.

The header 104 is connected to the chassis 102 by a feeder assembly 108, which includes a conveyor 110 configured to collect crop material and direct it to a threshing and separating system 112 inside the vehicle 100. Such threshing and separating systems 112 are known in the art and need not be described in detail herein. The feeder assembly 108 may be a simple rigid connection or an articulated connection comprising one or more linkage arms and/or feeder housing actuators (e.g., hydraulic pistons/cylinder actuators) that operate as housing position control mechanisms, as known in the art.

It will be appreciated that the header 104 and other parts described and illustrated herein do not necessarily need to be included on a combine harvester, but can be incorporated in other agricultural vehicles such as mowers, or provided as standalone replacement parts.

As shown in FIG. 2, the conveyor 110 comprises a plurality of chains 114 that support a plurality of slats 116. The chains 114 and slats 116 are contained within a housing 118. The housing 118 extends from an inlet opening 120 at the header 104, to an outlet opening 122 at the chassis 102. The conveyor 110 is supported adjacent the inlet opening 120 by a front drum 124, and at the rear opening 122 by a topshaft 126.

The topshaft 126 is configured to rotate about a center axis 126'. A number of sprockets 128 are rotationally fixed to the topshaft 126 and in toothed engagement with the chains 114. Thus, the sprockets 128 are configured to transmit rotational torque from the topshaft 126 to the chains 114. The topshaft 126 may be driven by a motor and gearbox 168 (shown schematically), or it may be an unpowered idler shaft. In either case, the sprockets 128 rotate with the topshaft 126 to provide a timing function to cause all of the chains 114 to rotate in unison. In FIG. 2, only one chain 114 and sprocket 128 are visible, but it will be understood that multiple chains 114 and sprockets 128 are provided along the width of the feeder assembly 108 (i.e., into the depth of the page in FIG. 2). For example, FIG. 3 shows four sprockets 128 attached to the topshaft 126, at respective locations spaced along the central axis 126'.

The conveyor 110 in this embodiment comprises flexible conveyors in the form of chains 114, and rotary drives in the form of sprockets 128. However, it will be appreciated that other embodiments may use flexible conveyors in the form of belts (e.g., flat, grooved, v-belts, etc.), and rotary drives in the form of flat or grooved pulleys. The conveyor 110 defines an operating path that surrounds a central housing frame 130, which is mounted to the housing 118.

Figure 3:
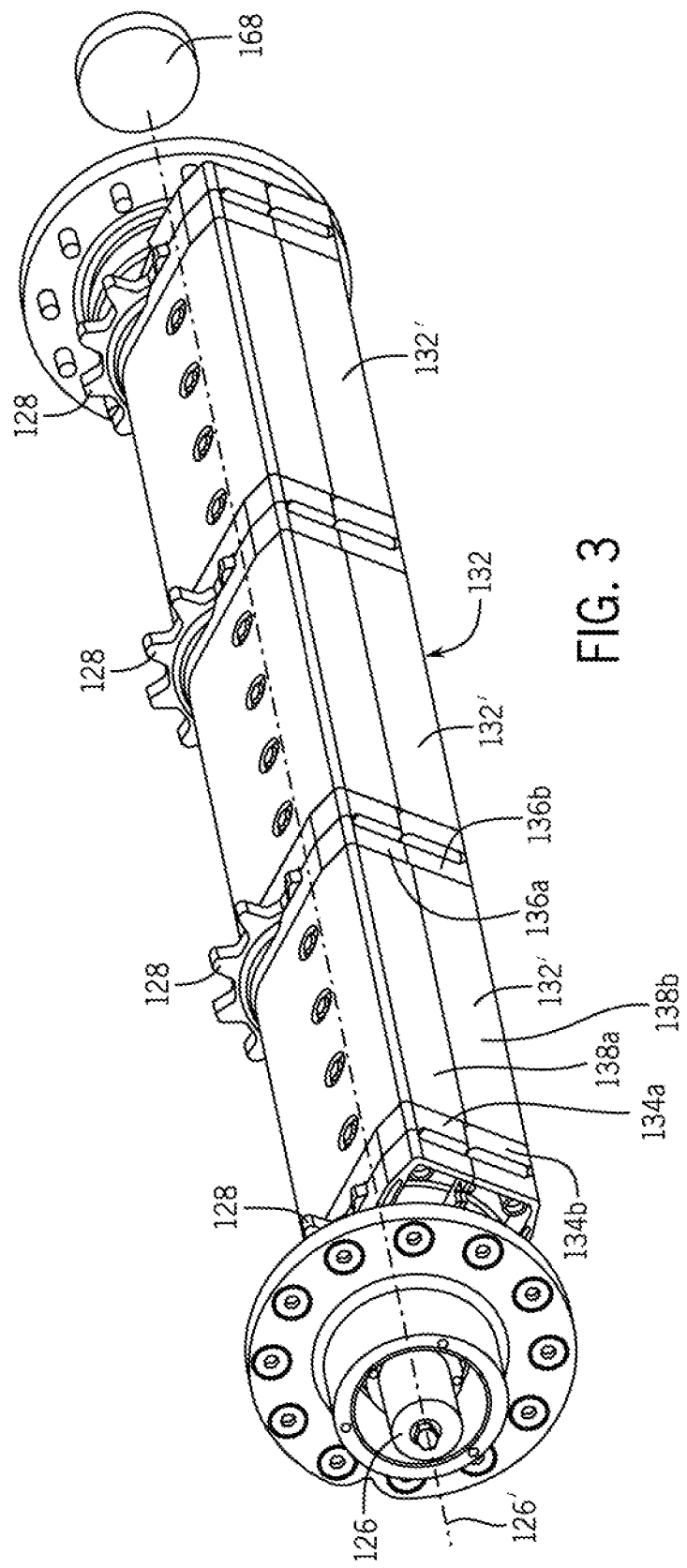
FIG. 3 is an isometric view of an exemplary topshaft and anti-wrap cover assembly.
Figure 4:
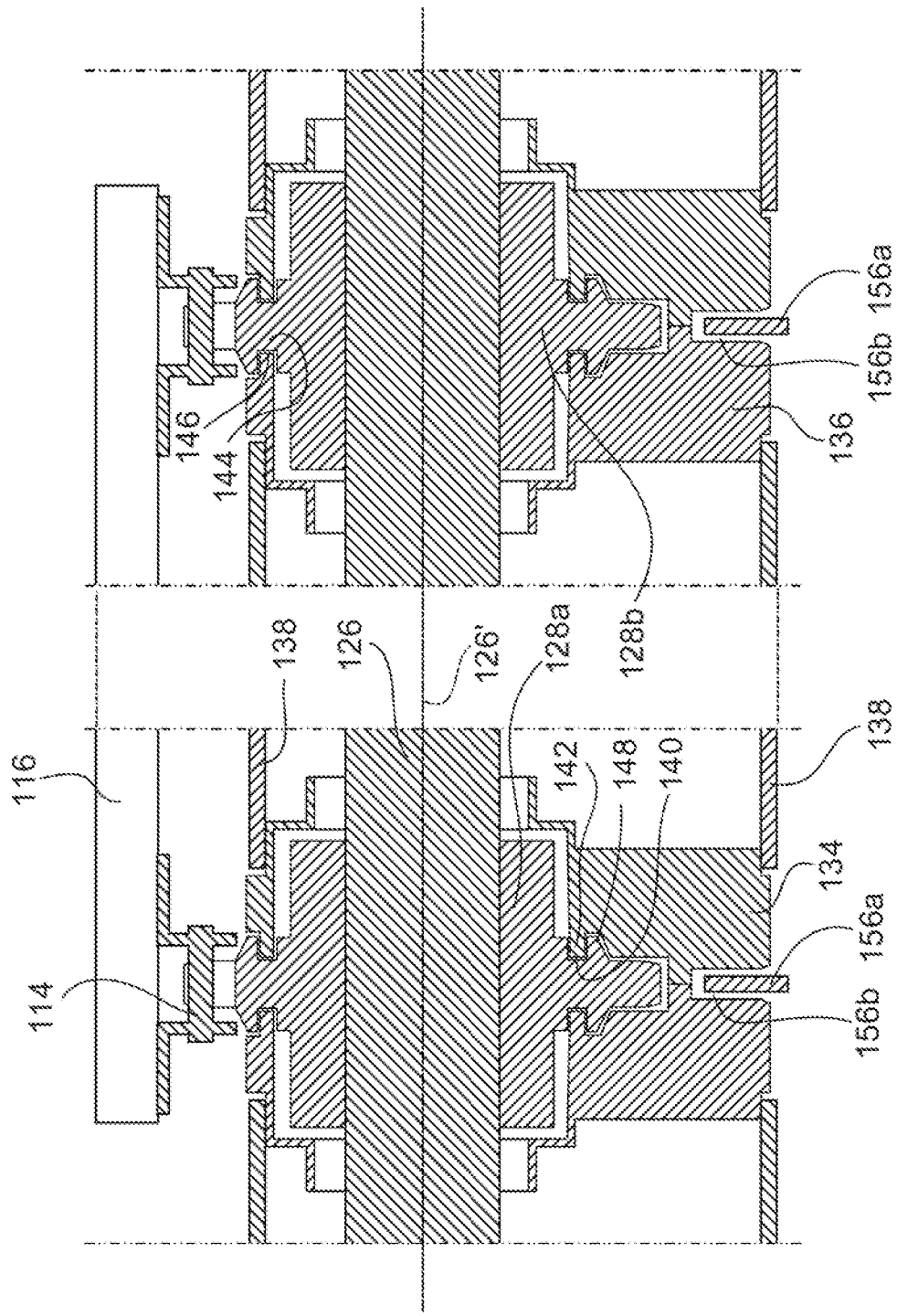
FIG. 4 is a cross-sectional view of portions of the topshaft and anti-wrap cover assembly of FIG. 3.

Referring now more specifically to FIGS. 3-4, a portion of the topshaft 126 between at least two adjacent sprockets 128 is at least partially surrounded by an anti-wrap cover assembly 132 that is configured to inhibit crop material from wrapping around the topshaft 126. More preferably, the anti-wrap cover assembly 132 spans the topshaft 126 between each adjacent pair of sprockets 128, and at least partially surrounds (and more preferably fully surrounds) the topshaft 126 circumferentially about the center axis 126'. The anti-wrap cover assembly 132 also preferably surrounds portions of each sprocket 128.

The anti-wrap cover assembly 132 may be formed by any suitable number or configuration of parts. In the shown embodiment, the anti-wrap cover assembly 132 comprises a separate sub-assembly 132' located between each adjacent pair of sprockets 128. Each sub-assembly 132' comprises a first drive cover 134 surrounding a portion of a first sprocket 128, a second drive cover 136 surrounding a portion of a second sprocket 128, and a shaft cover 138 extending from the first drive cover 134 to the second drive cover 136. The first drive cover 134 may be assembled from two or more parts 134a, 134b that are secured together to surround the central axis 126'. Similarly, the second drive cover 136 may be assembled from two or more parts 136a, 136b that are secured together to surround the central axis 126'. Likewise, the shaft cover 138 may comprise opposed housing members 138a, 138b that are attached to each other to surround the portion of the topshaft 126 extending from the first sprocket 128 to the second sprocket 128.

In some cases, the various parts of the anti-wrap cover assembly 132 may be interchangeable to facilitate ease of manufacture and cost savings. For example, the upper first drive cover part 134a may be identical to the lower second drive cover part 136b, and the lower first drive cover part 134b may be identical to the upper second drive cover part 136a. The two shaft cover parts 138a, 138b also may be identical. In addition, all or a portion of each sub-assembly 132' may be identical to one or more other sub-assemblies 132'. For example, the respective first and second drive covers 134, 136 of each sub-assembly 132' may be identical to each other. Similarly, the shaft covers 138 of each sub-assembly 132' may be identical to each other, or they may be provided in different lengths to accommodate different spacing between different pairs of adjacent sprockets 128.

Each sub-assembly 132' may be connected to each adjacent sub-assembly 132'. For example, bolts or the like may be used to connect the first drive cover 134 of one sub-assembly 132' to the second drive cover 136 of an adjacent sub-assembly 132'.

Referring to FIG. 4, the anti-wrap cover assembly 132 is mounted in a floating manner, such that it moves with the topshaft 126 and sprockets 128 as those parts might deflect or otherwise shift during use. In the example of FIG. 4, the first drive cover 134 and second drive cover 136 are each mounted in a sliding rotatable manner to a respective sprocket 128. More specifically, a first sprocket 128a has a first groove 140 that receives a first protrusion 142 extending from the first drive cover 134, and a second sprocket 128b has a second groove 144 that receives a second protrusion 146 extending from the second drive cover 136.

In this example, the first and second grooves 140, 144 each define a respective bearing face, and the first and second protrusions 142, 146 each define a respective bearing counterface that is in sliding contact with the respective bearing face. The bearing faces and counterfaces preferably comprise materials selected to provide long service life. For example, the bearing faces may be formed of smooth steel, and the counterfaces may be formed of durable plastic, and lubricating oil or grease may be provided to reduce friction. The bearing faces and counterfaces also may comprise sleeves of low-friction material (e.g., ultrahigh molecular weight polyethylene or polytetrafluoroethylene), self-lubricating plastic, or a material such as sintered bronze or the like to help retain lubricating oil.

In this example, the first and second grooves 140, 144 are each defined as a respective annular groove (i.e., a circular groove that is centered on the center axis 126', and extends into a side of the sprocket 128 along the direction of the center axis 126'). Other examples may have different arrangements of bearing faces and counterfaces to provide relative rotation between the anti-wrap cover assembly and the topshaft 126 and sprockets 128. For example, the annular grooves may be replaced with circumferential grooves or the like. As another example, the annular grooves may be replaced with notches (i.e., a groove that is open on one side). Other alternatives and variations will be apparent to persons of ordinary skill in the art in view of the present disclosure.

In this embodiment, the shaft cover 138 is mounted to the first drive cover 134 and the adjacent second drive cover 136, extends the entire distance from the first drive cover 134 and the second drive cover 136, and is not in contact with the topshaft 126. The shaft cover 138 may completely enclose the topshaft 126, or it may include openings for service or draining liquid, or openings where ingress of crop materials is not likely to occur.

The anti-wrap cover assembly 132 also may include features such as seals or the like to help prevent ingress of crop materials or moisture. For example, the sprockets 128 and first and second drive covers 134, 136 may include interleaved portions that form a labyrinth seal 148 to help prevent material passage.

Figure 6:
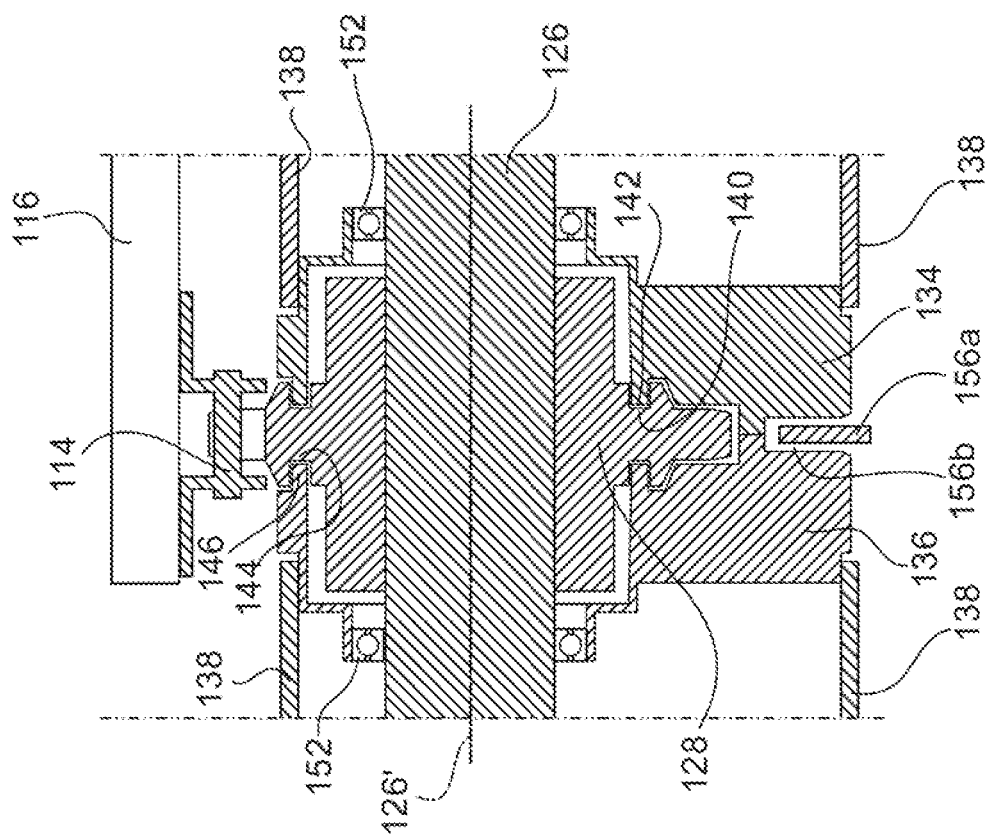
FIG. 6 is a cross-sectional view of portions of another exemplary topshaft and anti-wrap cover assembly.
Figure 5:
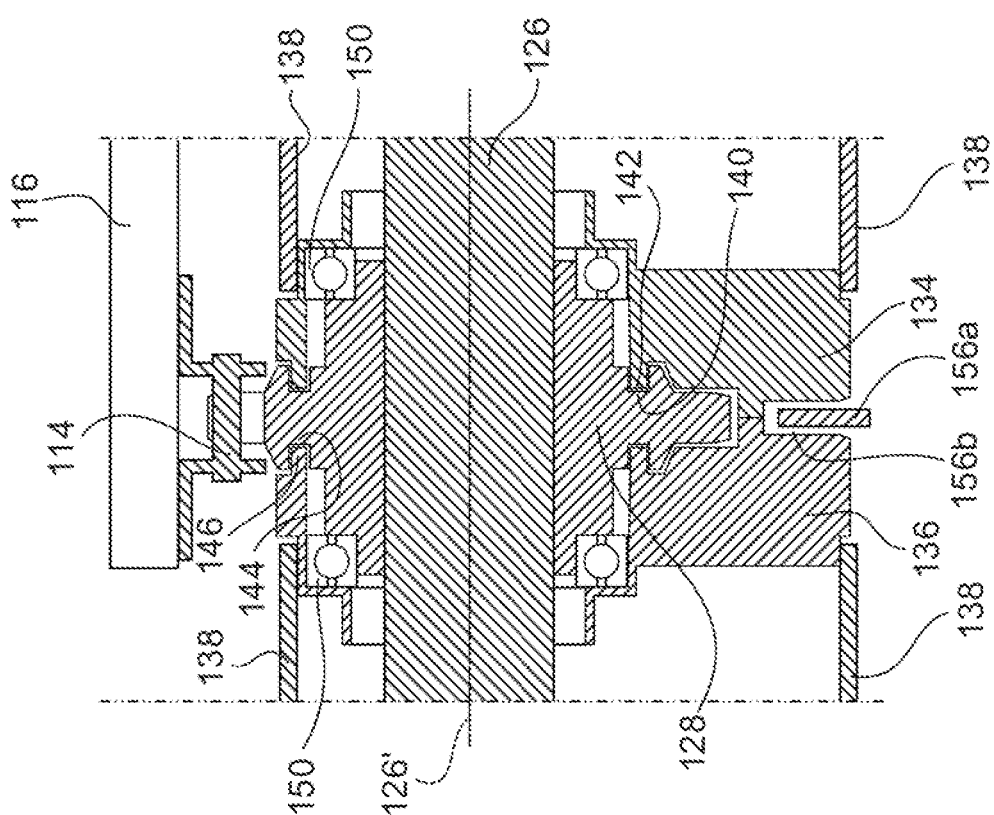
FIG. 5 is a cross-sectional view of portions of another exemplary topshaft and anti-wrap cover assembly.
Figure 7:
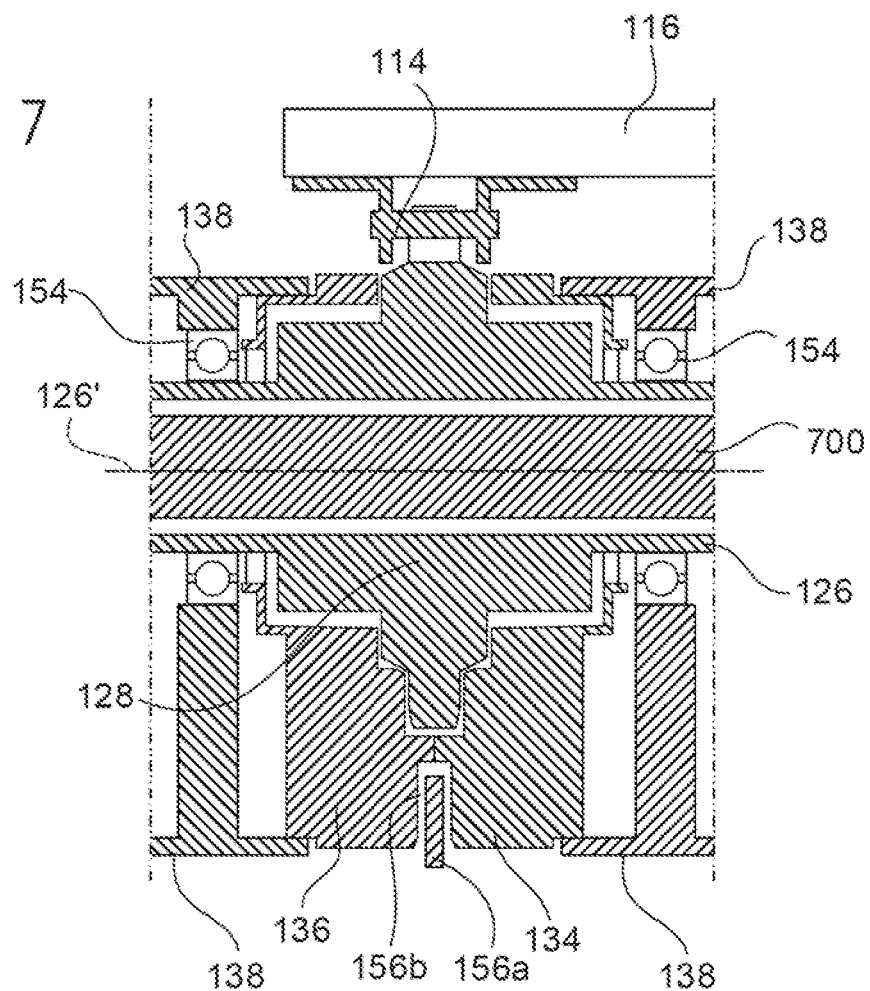
FIG. 7 is a cross-sectional view of portions of another exemplary topshaft and anti-wrap cover assembly.

FIGS. 5-7 show alternative examples of an anti-wrap cover assembly 132 mounted in a floating manner to the topshaft 126 and sprockets 128.

In FIG. 5, the first and second drive covers 134, 136 are mounted on the sprocket 128 by bearings 150. In this case, the grooves 140, 144 and protrusions 142, 146 may be omitted, or included as labyrinth seals.

In FIG. 6, the first and second drive covers 134, 136 are mounted to the topshaft 126 by bearings 152. Here again, the grooves 140, 144 and protrusions 142, 146 may be omitted, or included as labyrinth seals.

In FIG. 7, the shaft cover 138 is mounted to the topshaft 126 by bearings 154, and the first and second drive covers 134, 136 are mounted to the shaft cover 138. It would also be possible to mount the shaft cover 138 to the sprockets 128 by bearings.

FIG. 7 also shows an alternative construction of the sprocket 128 and topshaft 126 assembly. Namely, topshaft 126 is formed as a tube, and the sprockets 128 are welded or otherwise directly to the topshaft 126. In this case, the lateral spacing of the sprockets 128 is permanently fixed. The tubular topshaft 126 may be driven directly by the motor 168, or it may be mounted by splines or the like on a driveshaft 700 that is driven by the motor 168. The topshaft 126 also may be an idler shaft that is not directly driven about its axis. In this case, the drive covers 134, 136 and shaft cover 138 may float laterally with the sprockets 128 within the width of the housing, and the shaft 126 may be constrained laterally by bearings, shim washers, and the like. This variation can also be applied to other embodiments, such as those described herein.

In each of the foregoing examples, any kind of bearing or bushing can be used to provide a relatively low-friction connection between the parts.

In operation, the anti-wrap cover assembly 132 moves along with the topshaft 126 and sprockets 128 as they might deflect during use. However, the anti-wrap cover assembly 132 must be restrained from freely rotating with the topshaft 126 and sprockets 128. Thus, a connector is provided to allow the anti-wrap cover assembly 132 to float with the topshaft 126 and sprockets 128, while limiting rotation with the topshaft 126 and sprockets 128. FIGS. 8-11 illustrate various examples of connectors 156 that may be used with embodiments.

Figure 8:
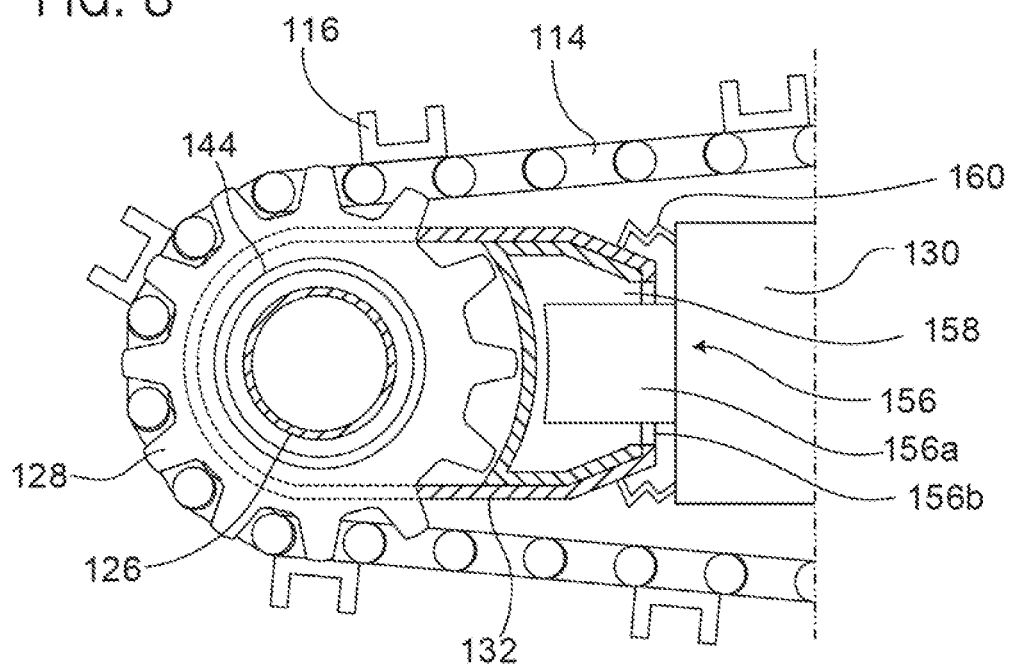
FIG. 8 is a cutaway side view of the topshaft and anti-wrap cover assembly of FIG. 3, including adjacent portions of a feeder housing, showing an exemplary connector between the housing and the anti-wrap cover assembly.

Referring to FIG. 8, in one example, the connector 156 may comprise a pin 156a that fits into a slot 156b. The pin 156a could have any cross-sectional shape (e.g., circular, square, rectangular, etc.) In FIG. 8, the pin 156a is shaped as a tab having a rectangular cross-section, with a larger height than width, but the pin 156a could have any number of dimensions or orientations. The pin 156a is fixed to one of the anti-wrap cover assembly 132 and the housing 118, and the slot 156b is provided on the other of the anti-wrap cover assembly 132 and the housing 118. In this case, the pin 156a is fixed to the housing 118, such as by being attached to the central housing frame 130, and the slot 156b is formed in the anti-wrap cover assembly 132, such as by being formed as a pocket between two adjacent drive covers 124, 126 (see, e.g., FIG. 4). The slot 156b is larger than the pin 156a, so as to form a gap 158. The gap 158 allows the anti-wrap cover assembly 132 to move through a predetermined range of movement relative to the housing 118. The range of movement preferably is sufficient to accommodate expected deflection of the topshaft 126 during operation. For example, the gap 158 may be sized to allow movement up and down, forwards and backwards, and left and right (all with respect to the forward direction F). The gap 158 also may allow the anti-wrap cover assembly 132 to rotate somewhat relative to the housing 118 (i.e., rotate along with the topshaft 126 through a limited range).

The connector 156 also may include other useful features. For example, the pin 156a or slot 156b may include or be formed as an elastic or shock-absorbing material, to reduce impact shock loads. As another example, the connector 156 may be surrounded by a flexible boot 160 to help prevent the ingress of crop materials. Other alternatives and variations will be apparent to persons of ordinary skill in the art in view of the present disclosure.

Figure 9:
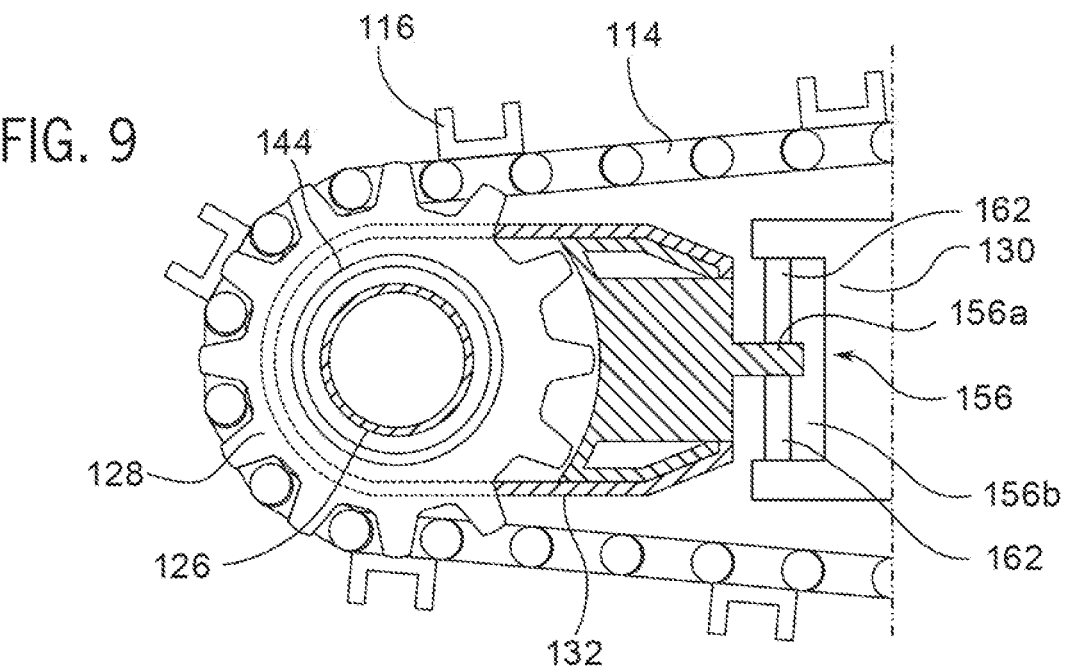
FIG. 9 is a cutaway side view of the topshaft and anti-wrap cover assembly of FIG. 3, including adjacent portions of a feeder housing, showing an exemplary connector between the housing and the anti-wrap cover assembly.

FIG. 9 shows another exemplary embodiment, in which the connector 156 comprises a pin 156a mounted to the anti-wrap cover assembly 132, and a slot 156b provided in the housing 118. In this case, one or more springs 162 are provided between the pin 156a and the walls of the slot 156b, to provide force attenuation and a positional biasing (e.g., self-centering) function. Such springs 162 could, of course, also be used with other embodiments of connectors 156.

Figure 10:
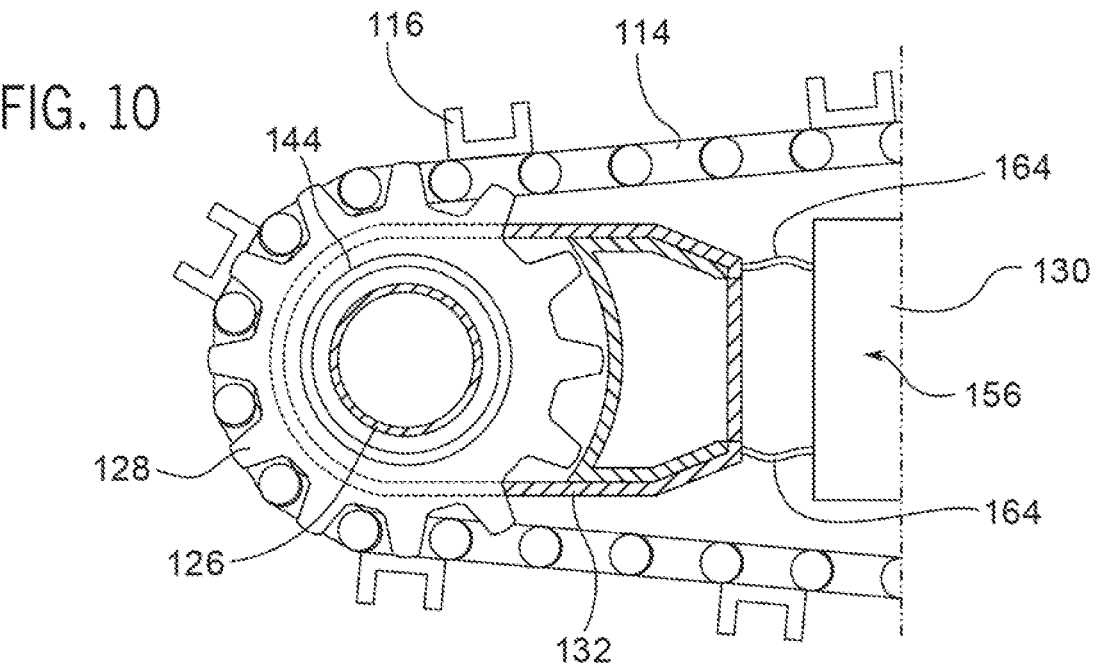
FIG. 10 is a cutaway side view of another topshaft and anti-wrap cover assembly, including adjacent portions of a feeder housing, showing another exemplary connector between the housing and the anti-wrap cover assembly.

FIG. 10 shows another exemplary embodiment, in which the connector 156 is provided in the form of one or more straps 164 that join the anti-wrap cover assembly 132 to the housing 118. Such straps 164 may comprise fabric or elastomer materials, metal (e.g., metal weave or chains), plastic materials, or the like.

Figure 11:
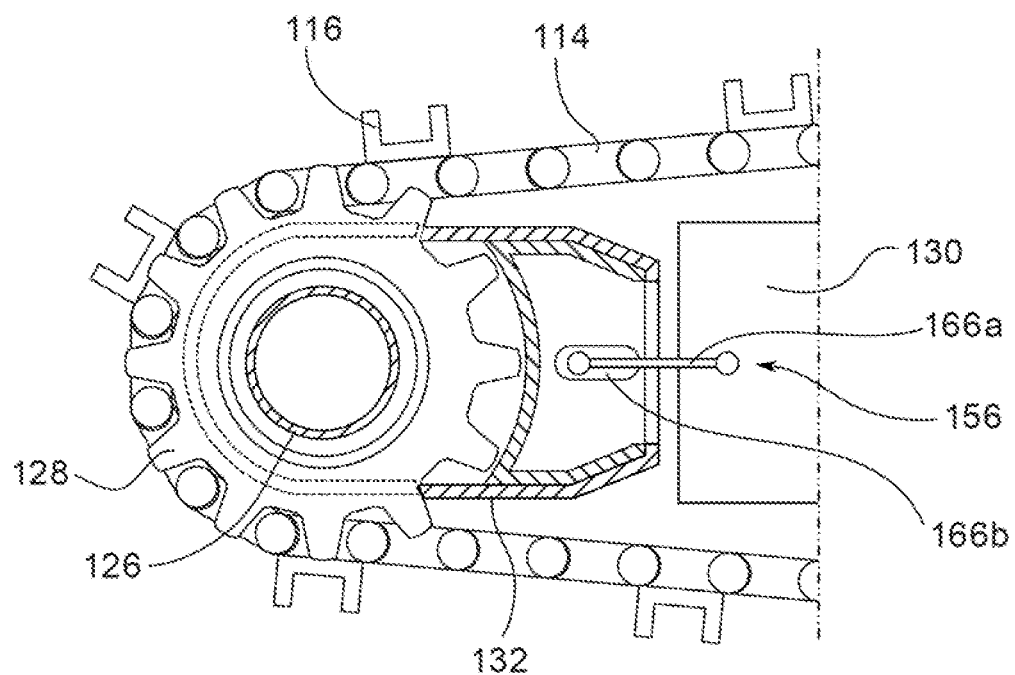
FIG. 11 is a cutaway side view of another topshaft and anti-wrap cover assembly, including adjacent portions of a feeder housing, showing another exemplary connector between the housing and the anti-wrap cover assembly.

FIG. 11 shows another exemplary embodiment, in which the connector 156 is provided in the form of a lost-motion linkage. The linkage is formed by a rod 166a that is rotationally fixed at one end to the housing 118 (e.g., at the central housing frame 130 or elsewhere), and slidingly received in a slot 166b on the anti-wrap cover assembly 132 (the opposite arrangement can also be used). As with the other examples, the linkage allows the anti-wrap cover assembly 132 to move through a limited range of motion relative to the housing 118, while floating along with deflections in the topshaft 118.

Embodiments such as those described herein are expected to provide a significant benefit over known anti-wrap assemblies. The floating anti-wrap cover assembly moves freely with the topshaft and sprockets as the topshaft deflects, thereby preventing hard contact between the anti-wrap cover and the sprockets and/or topshaft. This allows a tight fit between the anti-wrap cover and the rotating components, leading to improved isolation from crop materials. This also reduces wear of the anti-wrap cover.

The present disclosure describes a number of inventive features and/or combinations of features that may be used alone or in combination with each other or in combination with other technologies. The embodiments described herein are all exemplary, and are not intended to limit the scope of the claims. It will also be appreciated that the inventions described herein can be modified and adapted in various ways, and all such modifications and adaptations are intended to be included in the scope of this disclosure and the appended claims.

The invention claimed is:

1. A feeder assembly comprising:
a feeder housing;
a shaft mounted to rotate relative to the feeder housing about a center axis;
a first rotary drive mounted to rotate with the shaft at a first axial position along the shaft;
a second rotary drive mounted to rotate with the shaft at a second axial position along the shaft, the second axial position being spaced along the center axis from the first axial position;
an anti-wrap cover assembly extending an entire distance from the first rotary drive to the second rotary drive and at least partially surrounding the first rotary drive, the second rotary drive, and the shaft between the first rotary drive and the second rotary drive, the anti-wrap cover assembly being rotatably mounted to at least one of the first rotary drive, the second rotary drive and the shaft; and
a connector joining the feeder housing to the anti-wrap cover assembly and configured to allow the anti-wrap cover assembly to move through a predetermined limited range of motion relative to the feeder housing.

2. The feeder assembly of claim 1, wherein the first rotary drive and the second rotary drive each comprises a respective sprocket or a respective pulley.

3. The feeder assembly of claim 1, further comprising a first flexible conveyor configured to be driven by the first rotary drive, and a second flexible conveyor configured to be driven by the second rotary drive.

4. The feeder assembly of claim 3, wherein the first flexible conveyor and the second flexible conveyor each comprises a respective chain or a respective belt.

5. The feeder assembly of claim 1, wherein:
the first rotary drive comprises a first bearing face;
the anti-wrap cover assembly comprises a first bearing counterface in sliding contact with the first bearing face;
the second rotary drive comprises a second bearing face; and
the anti-wrap cover assembly comprises a second bearing counterface in sliding contact with the second bearing face.

6. The feeder assembly of claim 5, wherein:
the first bearing face comprises a first groove in the first rotary drive;
the first bearing counterface comprises a first protrusion extending from the anti-wrap cover assembly and into the first groove;
the second bearing face comprises a second groove in the second rotary drive; and
the second bearing counterface comprises a second protrusion extending from the anti-wrap cover assembly and into the second groove.

7. The feeder assembly of claim 6, wherein the first groove comprises a first annular groove, and the second groove comprises a second annular groove.

8. The feeder assembly of claim 1, wherein the anti-wrap cover assembly is rotatably mounted to the first rotary drive by a first bearing, and rotatably mounted to the second rotary drive by a second bearing.

9. The feeder assembly of claim 1, wherein the anti-wrap cover assembly is rotatably mounted to the shaft by one or more bearings.

10. The feeder assembly of claim 1, wherein the anti-wrap cover assembly comprises:
a first drive cover surrounding a portion of the first rotary drive;
a second drive cover surrounding a portion of the second rotary drive; and
a shaft cover extending from the first drive cover to the second drive cover.

11. The feeder assembly of claim 10, wherein the shaft cover comprises opposed housing members attached to each other to surround the shaft between the first rotary drive and the second rotary drive.

12. The feeder assembly of claim 10, wherein the first drive cover is rotatably mounted to the first rotary drive, the second drive cover is rotatably mounted to the second rotary drive, and the shaft cover is mounted to the first drive cover and the second drive cover and out of contact with the shaft.

13. The feeder assembly of claim 10, wherein the first drive cover is rotatably mounted to the shaft, the second drive cover is rotatably mounted to the shaft, and the shaft cover is mounted to the first drive cover and the second drive cover and out of contact with the shaft.

14. The feeder assembly of claim 1, further comprising a third rotary drive mounted to rotate with the shaft at a third axial position spaced along the center axis from the first axial position, with the second axial position between the first axial position and the third axial position; and wherein:
the anti-wrap cover assembly extends an entire distance from the second rotary drive to the third rotary drive and at least partially surrounds the second rotary drive, the third rotary drive, and the shaft between the second rotary drive and the third rotary drive.

15. The feeder assembly of claim 14, wherein the anti-wrap cover assembly comprises:
a first drive cover surrounding a portion of the first rotary drive;
a second drive cover surrounding a first portion of the second rotary drive;
a first shaft cover extending from the first drive cover to the second drive cover;
a third drive cover surrounding a second portion of the second rotary drive and connected to the second drive cover;
a fourth drive cover surrounding a portion of the third rotary drive; and
a second shaft cover extending from the third drive cover to the fourth drive cover.

16. The feeder assembly of claim 1, wherein the connector comprises:
a slot formed in one of the anti-wrap cover assembly and the feeder housing; and
a pin formed in the other of the anti-wrap cover assembly and the feeder housing and extending into the slot;
wherein the pin and the slot are dimensioned to allow the anti-wrap cover assembly to move relative to the feeder housing through the predetermined limited range of motion.

17. The feeder assembly of claim 1, wherein the connector comprises one or more springs configured to allow the anti-wrap cover assembly to move relative to the feeder housing through the predetermined limited range of motion.

18. The feeder assembly of claim 1, wherein the connector comprises one or more straps configured to allow the anti-wrap cover assembly to move relative to the feeder housing through the predetermined limited range of motion.

19. The feeder assembly of claim 1, wherein the connector comprises a lost-motion linkage configured to allow the anti-wrap cover assembly to move relative to the feeder housing through the predetermined limited range of motion.

20. The feeder assembly of claim 1, further comprising a flexible cover connecting the feeder housing to the anti-wrap cover assembly and surrounding the connector.

21. The feeder assembly of claim 1, wherein the first rotary drive and the second rotary drive are permanently fixed to the shaft at a predetermined spacing along the center axis.

22. The feeder assembly of claim 21, wherein the shaft comprises a hollow tube.

23. The feeder assembly of claim 22, further comprising a drive shaft located within the hollow tube, and attached to drive the hollow tube.

24. An agricultural vehicle comprising:
 a chassis configured for movement on a surface;
 a header configured to remove crop material from the surface;
 a feeder housing connected between the header and the chassis;
 a shaft mounted to rotate relative to the feeder housing about a center axis;
 a first rotary drive mounted to rotate with the shaft at a first axial position along the shaft;
 a second rotary drive mounted to rotate with the shaft at a second axial position along the shaft, the second axial position being spaced along the center axis from the first axial position;
 an anti-wrap cover assembly extending an entire distance from the first rotary drive to the second rotary drive and at least partially surrounding the first rotary drive, the second rotary drive, and the shaft between the first rotary drive and the second rotary drive, the anti-wrap cover assembly being rotatably mounted to at least one of the first rotary drive, the second rotary drive and the shaft; and
 a connector joining the feeder housing to the anti-wrap cover assembly and configured to allow the anti-wrap cover assembly to move through a predetermined limited range of motion relative to the feeder housing.

* * * * *